Patented May 4, 1937

2,079,395

UNITED STATES PATENT OFFICE 2,079,395

CELLULOSIC PRODUCT AND PROCESS OF MAKING SAME

Hamilton Bradshaw, Wilmington, Del., assignor, by mesne assignments, to E. I. du Pont de Nemours & Company, Wilmington, Del., a corporation of Delaware No Drawing. Application May 3, 1934, Serial No. 723,798

4 Claims. (Cl. 91—68)

This invention relates to moistureproofing compositions and to means for producing them. It relates more particularly to the production of moistureproofed regenerated cellulose pellicles adaptable for use as wrapping materials.

With the modern trends of development in the packaging of commodities, especially perishable foodstuffs, the need has arisen for a wrapping material which can at once provide physical protection against contamination, preservative action by retaining within the package the original conditions such as moisture content, and sales appeal by permitting examination of the package contents without destroying the wrapper. These needs have largely been filled by the recent introduction to the trade of a wrapping material comprising a transparent base, such as regenerated cellulose, coated with a transparent, moistureproofing composition, which latter may comprise a cellulose derivative, a wax, a resin or blending agent, and a plasticizer.

It is an object of this invention to provide a new moistureproofing composition. It is a further object of the invention to provide a new moistureproofing composition adaptable for use in the production of non-fibrous cellulosic moistureproof wrapping tissues. A further object of the invention relates to a new plasticizer for moistureproofing compositions adapted for the production of moistureproof wrapping materials. A further object of the invention resides in the use of cyclohexyl phthalate in moistureproofing compositions for coating regenerated cellulose sheets. Other objects of the invention will appear hereinafter.

For the purposes of this invention, moistureproof materials are defined as those which, in the form of a thin, continuous and unbroken sheet or film, will permit the passage of not more than 690 grams of water vapor per 100 square meters per hour, over a period of 24 hours at approximately 39.5° C.±0.5° C., the relative humidity of the atmosphere at one side of the film being maintained at least at 98% and the relative humidity of the atmosphere at the other side being maintained at such a value as to give a humidity differential of at least 95%.

Moistureproofing coating compositions are defined as those which when laid down in the form of thin, continuous, unbroken films, applied uniformly as a coating with a total thickness not exceeding 0.0005" to both sides of a sheet of regenerated cellulose of thickness approximately 0.0009", will produce a coated product which is moistureproof.

A moistureproofed regenerated cellulose sheet is capable of resisting the passage of moisture or water vapor therethrough at least ten times as effectively as the uncoated regenerated cellulose sheet.

This invention is primarily concerned with moistureproofing compositions comprising a cellulose nitrate, a moistureproofing agent, a plasticizer and preferably a blending agent such as a resin or gum. The term "moistureproofing agent" defines the material which serves as the basis for moistureproofness. In the formulation of cellulose nitrate coating compositions, it is well known in the art to use a plasticizing agent to impart flexibility to the coating. This is also true in the formulation of cellulose nitrate coating compositions which contain moistureproofing agents, but it has been observed that the plasticizer also contributes to the moistureproofing property and for the production of highly moistureproof coating compositions, more plasticizer is employed than is necessary merely for plasticizing action. The use of excess plasticizer to accomplish this purpose, however, tends to impair the surface characteristics of moistureproofing coating compositions, since with increased plasticizer content, the composition tends to become softer and stickier. The softness and stickiness are objectionable from the point of view of good surface slip and storage.

The composition may be coated onto the film base to give a wide range of coating thicknesses, and, for the purposes of this invention, and particularly where the ultimate coated sheet material is to be used as a wrapping tissue, the coating thickness on each side of the base will ordinarily be 0.00002" to 0.0005" and preferably 0.00005" on each side of the base.

In accordance with this invention, it has now been found that dicyclohexyl phthalate and cyclohexyl acid phthalate, either alone or in admixture with each other, may be used in lieu of known plasticizers to impart to cellulose nitrate-moistureproofing agent coating compositions flexibility, improved moistureproofness and good surface slip and storage characteristics. Throughout the balance of this specification, reference will be made to dicyclohexyl phthalate, but it is to be understood that cyclohexyl acid phthalate may advantageously be used although dicyclohexyl phthalate is preferred because of its somewhat superior properties.

To illustrate the beneficial effects resulting from the use of a cyclohexyl phthalate, sheets coated with moistureproofing compositions containing the same will possess good surface slip, and will not be subject to caking, slipping or marring in storage.

Generally speaking, the coating compositions embodied in this invention comprise dicyclohexyl phthalate or cyclohexyl acid phthalate in combination with a cellulose nitrate, a moistureproofing agent, and preferably a resin or other blending agent. In addition, other plasticizers, drying or non-drying oils, additional resinous material of either the natural or synthetic varieties, coloring agents either as dyes or pigments, or other modifying agents may be used according to the type of coating compositions desired. Obviously, for those uses where a transparent coated material is desired, any pigments or modifying agents which will impair the transparency of the coating composition will be omitted therefrom. The proportions of the several ingredients may vary within rather wide limits, depending on the properties desired in the finished composition and these will be more specifically set forth below and will be illustrated in the example.

As moistureproofing agents, it is possible to use waxes or wax-like materials such as paraffin, petrolatum, ceresin, japan wax, palm wax, beeswax, certain chlorinated hydrocarbons, Chinese insect wax or other synthetic waxes or wax-like material. If some of these waxes are too soft for the purposes desired, they may be mixed with harder waxes of the group or with carnauba wax, candelilla wax or other harder waxes. Generally, paraffin serves as a satisfactory moistureproofing agent which may be hardened if necessary by admixture with carnauba or candelilla wax. Asiatic paraffin is typical of a highly satisfactory moistureproofing agent, but it is to be understood that other moistureproofing agents may be substituted.

In the preparation of moistureproofing coating compositions comprising a cellulose nitrate and a moistureproofing agent, it is advantageous to include some material which will improve the compatibility of these two ingredients. This material is referred to as a blending agent and is usually of a resinous nature although this is not absolutely necessary. When the blending agent is resinous, advantage may be taken of its film-forming characteristics, if any, and sufficient quantity may be added to a coating composition to contribute towards the body and build of that composition in addition to the blending action. Depending on the nature of the blending agent, more or less plasticizing action on the cellulose nitrate may be obtained.

As blending agents, any of the natural or synthetic resins commonly available may be used so long as they are compatible and form homogeneous mixtures. Such resins may include ester gum, rosinates, damar, copal, kauri, poly-basic acid-polyhydric alcohol resinous condensation products, vinyl derivatives, chlorinated diphenyl resins, and soluble phenolformaldehyde resins. Non-resinous blending agents may be used when they yield homogeneous mixtures and these may include hydrogenated castor oil, castor oil phthalate, lanolin or wool grease, ethyl abietate, methyl abietate, diethylene glycol rosinate, or the like.

As illustrative of moistureproofing coating compositions which embody the principles of this invention, the following specific example is given but it should not be considered in any way as limitative of the scope of this invention.

*Example I.*—A moistureproofing coating composition was prepared according to the following manner: a pyroxylin base solution was prepared having the following composition:

| | Per cent |
|---|---|
| Pyroxylin | 12.5 |
| Ethyl alcohol | 14.9 |
| Acetone | 1.6 |
| Damar | 7.7 |
| Ethyl acetate | 31.4 |
| Toluol | 31.9 |

Another solution was prepared having the following formula:

| | Per cent |
|---|---|
| Paraffin | 1.5 |
| Ethyl acetate | 58.5 |
| Toluol | 40.0 |

There was then prepared a moistureproofing composition containing 80 grams of the pyroxylin base having the formula given above, 114.4 grams of wax solution of the formula given above, and 4.4 grams of dicyclohexyl phthalate. This moistureproofing coating composition was then coated on a regenerated cellulose pellicle of the type used as wrapping tissue, imparting a moistureproofness, upon drying, to the pellicle, the composite film having a good slip and flexibility.

The dicyclohexyl phthalate used in the above example represents approximately 100% substitution for conventional plasticizers used in moistureproofing compositions of this character. The proportion of dicyclohexyl phthalate can be varied within wide limits, for example, it may be used in amount which may be as low as 50% and as high as 150% of that used in the practice of the above example.

The film-forming ingredients, conveniently considered as solids, indicated in the above example, may be dissolved in any suitable solvent medium other than that described in the above example in accordance with the teachings of the art to give a coating solution of appropriate viscosity and solids content. The solution is applied onto the desired base according to known methods. The solvent is removed and the coated base subjected to an elevated temperature, at least equal to the melting point of the wax, when, after cooling, a clear, transparent, moistureproof coated base will be obtained. A suitable technique for this operation is set forth in Charch and Prindle U. S. Patent 1,737,187, and, since it is not a part of this invention, no further discussion seems necessary.

These solvent mixtures may be modified by the addition of other well known lacquer-solvents to obtain special drying effect without in any way affecting the unique properties of dicyclohexyl phthalate or cyclohexyl acid phthalate, as set forth in this specification.

These moistureproofing compositions may be applied to various sheet materials to produce wrapping tissues which are flexible and moistureproof and which exhibit good surface characteristics, including suitable surface slip, resistance to caking, sticking or marring during storage. A variety of base sheet materials may be used such as cellulosic materials, paper, albuminous materials (gelatine, agar-agar, casein), or films made from rubber derivatives and the like. In the preferred embodiment of the invention, a non-porous, non-fibrous, dense, smooth surfaced and preferably transparent material, such as regenerated cellulose, cellulose ester films, including cellulose nitrate or cellulose acetate, or cellulose ether films, including ethyl cellulose, benzyl cellulose, glycol cellulose, or lowly etherified celluloses such as those in which there is only one substituent group for several glucose units of cellulose, is employed. It is obvious that suitable solvent adjustment will be made for the formulation of moistureproofing coating compositions of the type described in order that there may be no harmful effect on the base material employed.

In the moistureproofing coating compositions the proportions of the several ingredients may be varied over a considerable range as is well known in the art.

The blending agent may vary according to the cellulose nitrate, plasticizer, or moistureproofing agent employed and it may constitute 1–20% or more of the total solids. The ratio of blending agent to moistureproofing agent may vary from 1:5 or less to 5:1 or more, and usually a ratio of approximately 3:1 to 4:1 will be found satisfactory. The larger amounts of blending agents are usually used when the blending agent exerts some plasticizing action and can therefore replace a portion of the plasticizer. The moistureproofing agent is usually present in a quantity sufficient to impart a suitable degree of moistureproofness while still maintaining suitable slip and storage characteristics, so that the ultimate moistureproofing coating on the moistureproofed article prepared in accordance with the invention will be clear, transparent, non-greasy, non-smeary and non-tacky under the normal conditions of handling or storage. If the moistureproofing agent constitutes less than 10% of the total solids, these conditions will be fulfilled, but while 2 to 6% of moistureproofing agent is preferred to yield the best results, it is to be understood that more or less may be used depending upon the nature of the moistureproofing agent. The plasticizer must be either dicyclohexyl phthalate or cyclohexyl acid phthalate or a mixture of plasticizers containing appreciable quantities of one or both of these specific compounds if the objects of the invention are to be accomplished. The total plasticizer concentration may vary from 20–45% of the total solids. Low percentages of plasticizer, however, are usually used only when the blending agent is capable of exerting a plasticizing action and can therefore substitute for a portion of the plasticizer which might otherwise be added. Among the objects of this invention is the production of highly moistureproof material, and for the accomplishment of this object, it is usually necessary to use relatively large amounts of plasticizer and as illustrated in the accompanying example, the use of 30–40% or more of plasticizer is preferred. When the total plasticizer comprises substances other than dicyclohexyl phthalate or cyclohexyl acid phthalate, such, for example, as dibutyl phthalate or a plasticizing blending agent, it is preferable that the dicyclohexyl phthalate or cyclohexyl acid phthalate predominate. Usually 50% or more of the total plasticizer should be provided by these substances, although as little as 25% or even less may be used with certain plasticizers without completely eliminating the unique property of these specific plasticizers. Because of the desired high percentage of plasticizer in the total composition, the ratio of plasticizer to moistureproofing agent may be quite high, in some instances amounting to as much as 20 to 1. On the other hand, if a plasticizing blending agent is used, the ratio of plasticizer to moistureproofing agent may fall as low as 6 to 1. Usually a a ratio of 7:1 to 10:1 will be found to serve satisfactorily.

In the preceding discussion of the proportions of the ingredients in the coating composition, the ranges of percentage composition or ratio have been given to facilitate the formation of highly satisfactory and preferred compositions and to aid one skilled in the art in quickly and easily arriving at operable compositions not specifically described in the example. It is to be understood, however, that these limiting ranges are largely illustrative and do not restrict the invention beyond the limitations set forth in the appended claims.

Throughout the specification, percentages and proportions are given in parts by weight unless indicated otherwise.

Any variation or modification of the invention which conforms to the spirit of the invention is intended to be included within the scope of the claims.

I claim:

1. A moistureproofing composition, suitable for use in producing a transparent, non-fibrous wrapping tissue, containing a cellulose derivative, a wax material and a compound which is solid at room temperature taken from the group consisting of dicyclohexyl phthalate and cyclohexyl acid phthalate.

2. A moistureproofing composition, suitable for use in producing a transparent, non-fibrous wrapping tissue, containing a cellulose derivative, a wax and a compound which is solid at room temperature taken from the group consisting of dicyclohexyl phthalate and cyclohexyl acid phthalate.

3. A transparent wrapping tissue comprising a non-porous, non-fibrous base pellicle coated with a moistureproofing composition containing a cellulose derivative, a wax material, and a compound which is solid at room temperature taken from the group consisting of dicyclohexyl phthalate and cyclohexyl acid phthalate.

4. A transparent wrapping tissue comprising a non-porous, non-fibrous base pellicle coated with a moistureproofing composition containing a cellulose derivative, a wax and a compound which is solid at room temperature taken from the group consisting of dicyclohexyl phthalate and cyclohexyl acid phthalate.

HAMILTON BRADSHAW.